(12) United States Patent
Appleford et al.

(10) Patent No.: US 10,101,464 B2
(45) Date of Patent: *Oct. 16, 2018

(54) GEOSPATIAL POSITIONING USING CORRECTION INFORMATION PROVIDED OVER CELLULAR CONTROL CHANNELS

(71) Applicant: Raven Industries, Inc., Sioux Falls, SD (US)

(72) Inventors: Kirk Appleford, Santa Barbara de Heredia (CR); Clinton Howard Mundt, Leander, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,525

(22) Filed: Jun. 7, 2016

(65) Prior Publication Data

US 2017/0003398 A1    Jan. 5, 2017

Related U.S. Application Data

(63) Continuation of application No. 13/462,598, filed on May 2, 2012, now Pat. No. 9,405,010.

(51) Int. Cl.
*G01S 19/41*    (2010.01)
*G01S 19/43*    (2010.01)
(Continued)

(52) U.S. Cl.
CPC ............. *G01S 19/41* (2013.01); *G01S 19/04* (2013.01); *G01S 19/07* (2013.01); *G01S 19/43* (2013.01)

(58) Field of Classification Search
CPC .......... G01S 19/07; G01S 19/41; G01S 19/04; G01S 19/43; G01S 19/05; G01S 19/06;
(Continued)

(56) References Cited

U.S. PATENT DOCUMENTS 5,510,798 A    4/1996 Bauer
5,884,220 A    3/1999 Farmer et al.
(Continued)

FOREIGN PATENT DOCUMENTS

CN    101437275 A    5/2009

OTHER PUBLICATIONS

"U.S. Appl. No. 13/462,598, PTO Response to Rule 312 Communication dated Jul. 7, 2016", 2 pgs.
(Continued)

*Primary Examiner* — Cassi J Galt
(74) *Attorney, Agent, or Firm* — Schwegman Lundberg & Woessner, P.A.

(57) ABSTRACT

Disclosed is a method of calculating a geospatial position by a mobile device by monitoring with the mobile device a first control channel from a first cell of a cellular communications system; monitoring with the mobile device a second control channel from a second cell of the cellular communications system at the same time as the first cellular control channel; receiving with the mobile device a first correction value sent over the first control channel; receiving with the mobile device a second correction value sent over the second control channel; receiving with the mobile device a signal from a global navigation satellite system; calculating with the mobile device the geospatial position based upon the signal from the global navigation satellite system and at least one of the first correction value and the second correction value.

20 Claims, 7 Drawing Sheets

(51) Int. Cl.
*G01S 19/04* (2010.01)
*G01S 19/07* (2010.01)

(58) Field of Classification Search
CPC ...... G01S 19/25; G01S 19/252; G01S 19/254; G01S 19/256; G01S 19/258
See application file for complete search history.

(56) References Cited

U.S. PATENT DOCUMENTS

| | | | |
|---|---|---|---|
| 6,058,338 | A | 5/2000 | Agashe et al. |
| 6,064,889 | A | 5/2000 | Fehnel |
| 6,108,551 | A | 8/2000 | Lehmusto et al. |
| 6,128,501 | A | 10/2000 | Ffoulkes-Jones |
| 6,323,803 | B1 | 11/2001 | Jolley et al. |
| 6,901,260 | B1 | 5/2005 | Xin |
| 7,053,824 | B2 | 5/2006 | Abraham |
| 7,295,156 | B2 | 11/2007 | Van Wyck Loomis |
| 7,312,748 | B2 | 12/2007 | Monnerat |
| 7,358,896 | B2 | 4/2008 | Gradincic et al. |
| 7,471,239 | B1 | 12/2008 | Huang |
| 7,528,769 | B2 | 5/2009 | Wirola |
| 7,580,794 | B2 | 8/2009 | Janky |
| 7,626,539 | B2 | 12/2009 | de Salas |
| 7,683,831 | B2 | 3/2010 | Fischer |
| 7,688,260 | B2 | 3/2010 | Pomerantz et al. |
| 7,701,387 | B2 | 4/2010 | Syrjarinne |
| 7,724,185 | B2 | 5/2010 | Syrjarinne |
| 7,737,887 | B2 | 6/2010 | Remondi |
| 7,737,888 | B2 | 6/2010 | Remondi |
| 7,764,225 | B2 | 7/2010 | Syrjarinne |
| 7,768,449 | B2 | 8/2010 | Gaal et al. |
| 7,817,084 | B2 | 10/2010 | Pon |
| 7,847,728 | B2 | 12/2010 | Thomson et al. |
| 7,859,453 | B2 | 12/2010 | Rowitch et al. |
| 7,884,762 | B2 | 2/2011 | Abraham |
| 7,890,119 | B2 | 2/2011 | Jethwa |
| 7,893,869 | B2 | 2/2011 | Gaal et al. |
| 7,920,091 | B2 | 4/2011 | Thomson |
| 7,920,873 | B2 | 4/2011 | Tang-Taye |
| 7,948,435 | B2 | 5/2011 | Harper et al. |
| 7,956,805 | B2 | 6/2011 | Pon |
| 7,965,232 | B2 | 6/2011 | Wirola et al. |
| 7,969,352 | B2 | 6/2011 | DiLellio et al. |
| 7,969,353 | B2 | 6/2011 | de Salas |
| 7,999,730 | B2 | 8/2011 | Thomson |
| 8,000,702 | B2 | 8/2011 | Dawson |
| 8,010,124 | B2 | 8/2011 | Osborn et al. |
| 8,022,867 | B2 | 9/2011 | Pomerantz |
| 8,041,370 | B2 | 10/2011 | Pomerantz |
| 8,044,853 | B2 | 10/2011 | Zhao et al. |
| 8,077,084 | B2 | 12/2011 | Syrjarinne et al. |
| 8,077,085 | B2 | 12/2011 | Huang |
| 8,078,192 | B2 | 12/2011 | Wirola et al. |
| 8,081,107 | B2 | 12/2011 | Kosoiobov et al. |
| 8,085,194 | B2 | 12/2011 | Abraham |
| 8,111,189 | B2 | 2/2012 | Abraham |
| 9,405,010 | B2 | 8/2016 | Appleford et al. |
| 2003/0125073 | A1 | 7/2003 | Tsai |
| 2005/0064878 | A1 | 3/2005 | O'Meagher |
| 2005/0191958 | A1 | 9/2005 | Hoskins |
| 2006/0154600 | A1 | 7/2006 | Ferris |
| 2006/0209801 | A1 | 9/2006 | Joshi |
| 2009/0303116 | A1 | 12/2009 | Wirola et al. |
| 2011/0001011 | A1 | 1/2011 | Degiorgis et al. |
| 2011/0021209 | A1 | 1/2011 | Longginou et al. |
| 2011/0032859 | A1 | 2/2011 | Wirola et al. |
| 2011/0230178 | A1 | 9/2011 | Jones et al. |
| 2011/0316741 | A1 | 12/2011 | Chansarkar |
| 2013/0293412 | A1 | 11/2013 | Appleford et al. |

OTHER PUBLICATIONS

"U.S. Appl. No. 13/462,598, Final Office Action dated Aug. 11, 2015", 13 pgs.
"U.S. Appl. No. 13/462,598, Non Final Office Action dated Jan. 13, 2015", 12 pgs.
"U.S. Appl. No. 13/462,598, Notice of Allowance dated Mar. 7, 2016", 9 pgs.
"U.S. Appl. No. 13/462,598, Response filed Jan. 4, 2016 to Final Office Action dated Aug. 11, 2015", 15 pgs.
"U.S. Appl. No. 13/462,598, Response filed May 19, 2015 to Non Final Office Action dated Jan. 13, 2015", 16 pgs.
3GPP, "3GPP TS 22.071 V10.0.0", 3GPP TS 22.071 V10.0.0 (Mar. 2011), (Mar. 2011), 52 pgs.
3GPP, "3GPP TS 23.271 V10.2.0", 3GPP TS 23.271 V10.2.0 (Mar. 2011), (Mar. 2011), 169 pgs.
3GPP, "3GPP TS 25.305 v10.0.0", 3GPP TS 25.305 v10.0.0 (Sep. 2010), (Sep. 1, 2010), 80 pgs.
3GPP, "3GPP TS 44.031 V10.0.0", 3GPP TS 44.031 V10.0.0 (Jun. 2010), (Jun. 2010), 148 pgs.
3GPP, "3GPP TSG-RAN WG2 Meeting #53 Tdoc R2-061742", 3GPP TSG-RAN WG2 Meeting #53 Tdoc R2-061742 Shanghai, China, May 8-12, 2006, (May 8, 2006), 10 pgs.
3GPP, "TSG-GERAN Meeting #30 GP-061215", 3GPP TSG-GERAN Meeting #30, GP-061215 Lisbon Portugal, Jun. 26-30, 2006, (Jun. 26, 2006), 4 pgs.
Locata Corp, "Locata Tech Explained", [Online]. Retrieved from the Internet: <URL: http://www.locatacorp.com/technology/locata-tech-explained/>, (Accessed May 2, 2012), 3 pgs.
Locata Corp, "Technology Overview", [Online]. Retrieved from the Internet: <URL: http://www.locatacorp.com/technology/>, (Accessed May 2, 2012), 3 pgs.
Locata Corp., "How is Locata not like GPS?", [Online]. Retrieved from the Internet: <URL: http://www.locatacorp.com/technology/locata-tech-explained/how-is-locata-not-like-gps/>, (Accessed May 2, 2012), 3 pgs.
Locata, Corp., "How is Locata like GPS?", [Online]. Retrieved from the Internet: <URL: http://www.locatacorp.com/technology/locata-tech-explained/how-is-locata-like-gps/>, (Accessed May 2, 2012), 3 pgs.
Locata, Corp. "Locata's Inventions", [Online]. Retrieved from the Internet: <URL: http://locatacorp.com/technology/locata-tech-explained/locatas-inventions/>, (Accessed May 2, 2012), 3 pgs.
Wirola, Lauri, et al., "On the Feasibility of Adding Carrier Phase-Assistance to Cellular GNSS Assistance Standards", Journal of Global Positioning Systems (2007) vol. 6, No. 1: 1-12, (2007), 12 pgs.

GEOSPATIAL POSITIONING USING CORRECTION INFORMATION PROVIDED OVER CELLULAR CONTROL CHANNELS

RELATED APPLICATIONS

This application is a continuation of U.S. patent application Ser. No. 13/462,598, filed May 2, 2012, which application is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc., All Rights Reserved.

BACKGROUND

Global Navigation Satellite Systems (GNSS) allow devices to calculate their geospatial position based upon signals sent from GNSS satellites. Example GNSS' include the Global Positioning System (GPS), Globalnaya Navigatsionnaya Sputnikovaya Sistema (GLONASS), and Galileo. While the accuracy of a position calculated from a typical GNSS system is adequate for some tasks, greater accuracy is required for things like precision navigation applications such as machine guidance systems. Various techniques have been developed which utilize correction information to assist GNSS receiver devices to increase the accuracy of their positional calculations. One such example is Real Time Kinematics (RTK). In RTK systems, a device whose position is to be accurately determined (often called a "rover"), will utilize GNSS correction information sent from a nearby GNSS correction generation device (e.g., an RTK correction generation device—sometimes called an RTK "base station" or an RTK "reference station") to correct the geospatial location calculated from the GNSS system.

In some cases, the GNSS correction generation device is an on-site, or nearby device which wirelessly transmits the GNSS correction information directly to the rover. These on-site GNSS correction generation devices are typically expensive and must be setup prior to use. Furthermore, a rover must stay within range of the wireless transmission which makes it unsuitable for precision navigation over longer distances.

In order to make GNSS correction information more accessible and easier to use, various entities have setup numerous disparate networks of GNSS correction generation devices. These networks feature numerous GNSS correction generation devices that transmit their corrections to a central server (generally over the Internet). The central server then provides the GNSS correction information over the Internet to anyone subscribed. Rovers may then contact the central server over the Internet to receive the GNSS correction information. Typically a rover utilizes a cellular network to connect to the central server over the Internet. This solution is not always reliable and may suffer from latency issues as the GNSS correction information has to flow from the correction generation unit, across the Internet to the correction server, then back over the Internet to the cell phone provider's network, through the cell phone provider's gateway router, through the radio access network, and finally to the rover. If any one of these components fail or delays too long in sending the information the GNSS correction information may be lost, unusable, or less reliable. Additionally, if the rover unit hands over from one cell of the cellular network to another, there may be significant delays in the delivery of the GNSS correction information as the dedicated resources reserved for the rover that are used to deliver the GNSS correction information must hand over to another cell. This typically takes time to complete the handover (which may delay GNSS correction information) and increases the chances of a failure.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
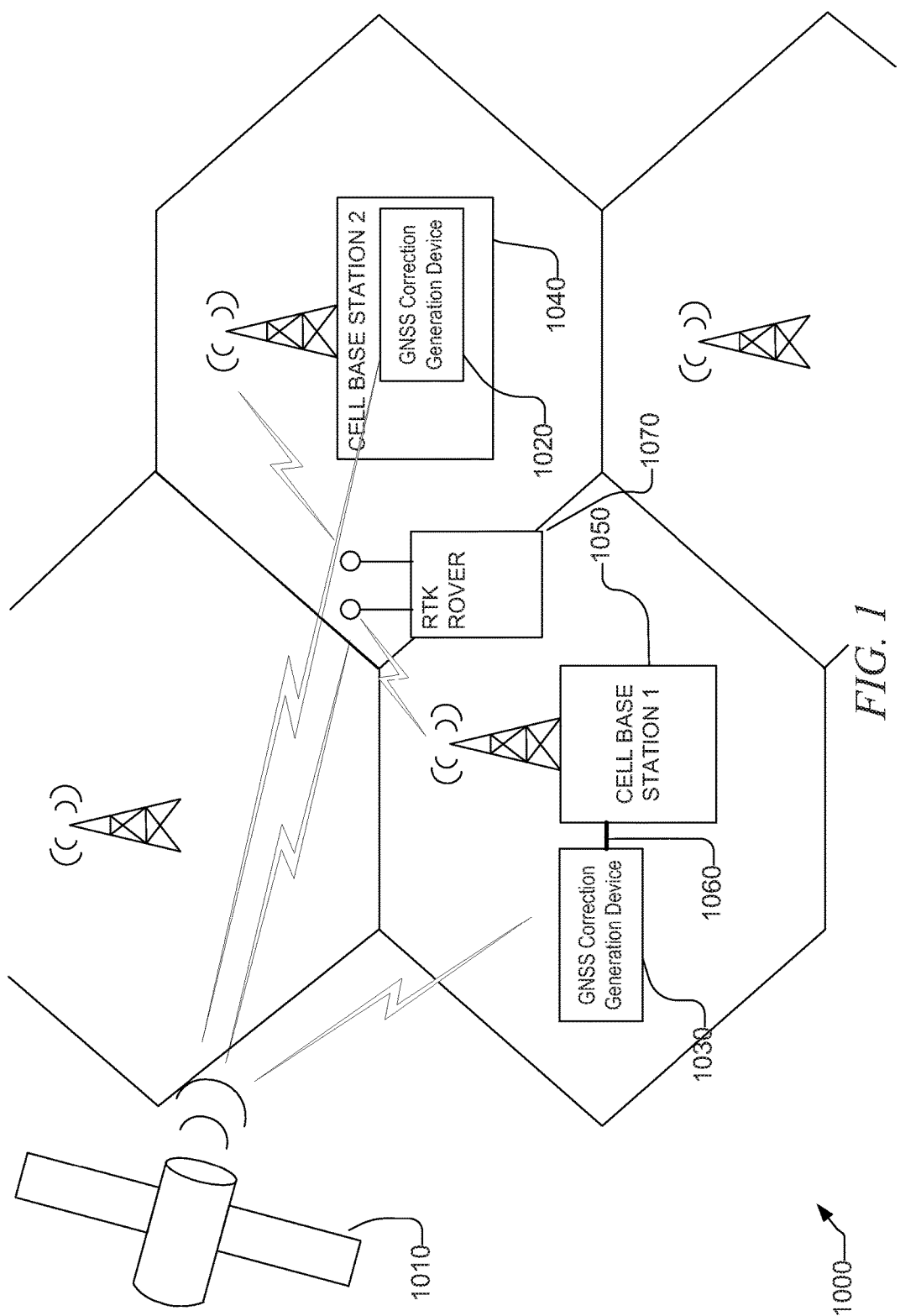
FIG. 1 shows a schematic of a system of providing GNSS correction information over control channels of a cellular network according to some examples of the present disclosure.

Disclosed in some examples are various apparatuses, machine readable mediums, systems, and methods for providing GNSS correction information (e.g., RTK correction information) to mobile devices (e.g., rovers) over the control plane of a cellular network. Disclosed in other examples are various apparatuses, machine readable mediums, systems and methods for receiving GNSS correction information over the control plane of a cellular network and using that GNSS correction information to calculate a geospatial position. The cellular base station obtains GNSS correction information through an integrated or nearby GNSS correction generation device (e.g., an RTK base station) and then transmits this GNSS correction information on one or more control channels transmitted by the cellular base station. The GNSS correction information can thus be locally generated and locally transmitted at the cellular base station site. By using GNSS correction information sent over a control channel, the rover need not establish a dedicated data connection as it must to access a traditional GNSS correction network. This solution may avoid complicated and time consuming signaling thereby increasing reliability and reducing latency between correction calculation and delivery (as the correction information has to flow through fewer network components to reach the rover). Additionally, rover units may monitor multiple control channels of multiple cells (in some examples the rovers may do so simultaneously and/or continuously) where cells in a cellular network overlap in coverage. This can provided a number of advantages. For example, when a rover moves out of range of a particular cell, there can be minimal or no interruption in the flow of GNSS correction information as there are no dedicated resources to move to a new cell and the rover may simply switch to using the GNSS correction information transmitted from other monitored cells. Also, as the rover receives GNSS correction information from more than one GNSS correction generation device, the rover may even more accurately determine its position relative to using just one set of GNSS correction information.

Utilizing the cellular networks to delivery GNSS correction information allows for the utilization of multiple independent correction streams (e.g., correction information transmitted from more than one cell) by the device which provides certain advantages over other alternative approaches. These alternative approaches may provide multiple corrections, but over the same stream same data link). Namely, in the later approaches, if the single stream fails for any reason, correction data ceases. In the former approach, correction data is still available from other streams e.g., the device may switch to monitoring correction data from other cells that have not failed).

Example cellular networks may include cellular networks operating in accordance with a Third Generation Partnership Project (3GPP or 3GPP2) family of standards, such as a Global System for Mobile communications (GSM) standard, a Universal Mobile Telecommunications System (UMTS) standard, a Long Term Evolution (LTE) standard, a Code Division Multiple Access (CDMA) standard, a CDMA2000 standard, a CDMA2000 Evolved Data Optimized (EV-DO) standard, and the like. These systems typically divide up the geographical area they serve into a plurality of "cells." A cell may be defined as a unit of geographic coverage served by a particular transmission station or "base station," Each base station may support one or more cells and are typically connected to other base stations, and to a cellular core network component either directly or through a controller (e.g., a Radio Network Controller (RNC) in UMTS). The base stations and controllers typically comprise the Radio Access Network (RAN) portion of the cellular network. The other major component of the cellular network comprises a core network which includes a group of equipment operated by the cellular service provider which includes functionality for billing and access control, mobile location registration (e.g., tracking where in the RAN the mobile is currently located so as to deliver data and voice calls to the mobile), interfaces to external networks (such as a Public Switched Telephone Network (PSTN) and the Internet), and the like.

Traffic on a cellular network can be divided into user planes and control planes. User traffic is generally handled and carried on the user plane, whereas control information necessary to carry out the functions of the cell is carried on the control plane. The control plane is typically transmitted across "control channels." Control channels are transmission links in a communication system dedicated to sending and/or receiving control messages between devices. Example control messages include cell information, paging, access control (channel assignment), and broadcast messages. Example control channels from the GSM system include the broadcast control channel, common control channels and dedicated control channels (including stand alone dedicated control channels). Example control channels from the UMTS system include: Broadcast Control Channel, Paging Control Channel, Dedicated Control Channel, Common Control Channel, and Shared Channel Control Channel. Example logical control channels for the LTE system include: Broadcast Control Channel, Paging Control Channel, Common Control Channel, Multicast Control Channel, and Dedicated Control Channel. EV-DO systems utilize a single control channel.

Typically cellular devices wishing to utilize resources of the cellular network "attach" themselves to the cell via signaling on the control plane. This means that the cellular devices utilize the information contained on the control channels to register with the cellular network so that the cellular network can authenticate and authorize the device as well as update itsilocation records so it can page the mobile if necessary (e.g., if a call is placed to the mobile). This process of attachment typically takes some signaling between the mobile station and the cellular network. Once the mobile is attached to a particular cell it generally will monitor the control channels of that cell for system information about the cellular network or for any specific messages directed to the mobile.

If the cellular device has data or voice to transmit, the device must reserve certain dedicated cellular network resources from the cellular network. For example, air interface resources such as a time slot, a channel, an orthogonal code, data block allocation, or the like; and ground based resources such as resources on the core network, or backhaul resources to carry data between the base station and the core network, or the like. The signaling to reserve these resources typically takes time and is subject to many points of possible failure.

If the mobile device trawls outside the range of a particular cell, the mobile is "handed over" to another cell. Typically this requires additional signaling between the mobile and the cellular network and results in any resources which are currently reserved for the mobile being transferred to the new cell or the establishment of new resources at the new cell. The handover process is based on the mobile's periodic scans of neighboring cells (information about which is transmitted to the mobile by the current cell) to determine a link quality between the neighbor cells and the mobile. These measurements are typically sent to the cellular network which then makes a decision as to whether or not to handover the mobile to a different cell based on the measurements and the various handover algorithms in the cell. These handover algorithms ensure that the device is served by an appropriate cell. The additional signaling required during the handover process may take time and may lead to interruptions in the connection, as well as being subject to many possible points of failure.

Providing GNSS correction information across cellular control channels of a widely available cellular network is beneficial in that it delivers locally generated and locally transmitted GNSS correction information with far less signaling (i.e., potentially no need to setup dedicated resources), less latency, fewer failure points, and allows for calculating a geospatial position of the rover with increased accuracy (if the rover utilizes the GNSS correction information from multiple cells).

Turning now to FIG. 1, an example system 1000 of providing GNSS correction information over a cellular network is shown. GNSS satellite 1010 may broadcast a signal used by various GNSS receivers (such as correction generation devices 1020, 1030 and rover 1070) to determine their geospatial positions. The signals in some examples may contain a time that the message was transmitted, precise orbital information of the satellite sending the message (e.g., the ephemeris), general GNSS system health, and rough orbits of the other satellites (e.g., the almanac). The receivers may use the information in the message sent by the GNSS to determine the transit time of the message. Based on the transit time the receiver may compute the distance between the receiver and the satellite. The receiver may pinpoint its position by determining the distance between the receiver and multiple GNSS satellites. In other examples, instead of using the contents of the message to determine the distance between the rover and the satellite, the receivers may utilize the satellite's carrier and not the messages contained within it. This allows for greater accuracy as the code broadcast in a signal (for L1 GPS) changes phase at 1.023 MHz, but the L1 carrier itself changes phase at 1575.42 MHz, which allows for a much more precise determination.

In order to calculate a geospatial position using the above techniques, or to provide enhanced accuracy for the above techniques, the rover may utilize GNSS correction information transmitted from a fixed and known location (e.g., RTK correction information). For example, one type of GNSS correction information may be used by the receivers to align the phases of the signals to enable a more accurate positional calculation. GNSS correction generation devices 1020 and 1030 may generate this GNSS correction information. In one example, the GNSS correction generation device 1020 is integrated with a cellular base station 1040. In another example, the GNSS correction device 1030 is separate from cell base station 1050 and communicates GNSS correction information for transmission over the cellular control channels over interface 1060. Interface 1060 may be any data transmission interface which is capable of supplying GNSS correction information to the cellular base station 1050. Example interfaces 1060 may include Universal Serial Bus (USB) interface, parallel port interface, serial port interface, Ethernet interface, fiber optic interfaces, wireless connections such as Bluetooth, 802.11, Zigbee, or the like. Interface 1060 may be outside of the normal communication interfaces utilized by the base stations to communicate with other components of the cellular network. For example, in UMTS, the interface 1060 may be outside the IUB interface. The IUB interface is a UMTS interface which connects a base station (Node B in UMTS) with an RNC (radio network controller). In yet other examples, the interface 1060 may be part of, or inject messages into, the normal communication interfaces utilized by the base stations. For example, the interface 1060 may connect to a component inside the base station 1050 which may monitor the normal cellular interfaces (e.g., the IUB) and may insert the GNSS correction information into the interface (e.g., the IUB interface) at an appropriate time. In these examples, the interface 1060 may disguise the GNSS correction information such that it appears to the base station to be coming from another part of the cellular network (e.g., RNC). This may allow the methods disclosed herein to be implemented without modification to the source code of the base station or other cellular network components.

Cell base stations 1040 and 1050 are any base station capable of providing a cell of a cellular network. Example base stations 1040 and 1050 include a NodeB, an Enhanced Node B (eNB), a Base Transceiver Station (BTS), or the like. These cell base stations 1040 and 1050 may transmit the GNSS correction information over any control channel offered. In some examples, control channels which are broadcast out to all the mobiles in a cell may be utilized to send the GNSS correction information (e.g., a broadcast control channel such as the BCCH). In these examples, a rover may not need to attach to any cells in order to receive the correction information as the correction information is broadcast to all mobiles capable of receiving the broadcast channel. In other examples, the GNSS correction information may be placed on a control channel which may be directed at only particular mobiles. For example, the GNSS correction information may be sent on a stand-alone dedicated control channel (SDCCH) of a GSM network. To receive GNSS correction information directed only at particular mobiles, the rover may have to attach to the cell which transmits these directed messages. In some examples, to achieve this, the rover may attach to multiple cells simultaneously as described below. While attaching to a cell requires some signaling effort, the signaling required to attach to a cell is still much less than that required to setup a dedicated connection.

The GNSS correction data transmitted by the cellular base stations may in some examples conform to the Radio Technical Commission for Marine Services (RTCM) 10403.1 "Differential GNSS Services—Version 3, with Amendments 1-5 published Jul. 1, 2011, incorporated herein by reference in its entirety.

Rover 1070 may be any device capable of calculating a geospatial position based upon the received satellite signals from a GNSS device 1010 and receive and decode the GNSS correction information generated and sent by the GNSS correction generation devices 1020 or 1030 over the control plane of one or more cells provided by cellular base stations (such as base stations 1040 or 1050). Rover 1070 may simultaneously monitor the control channels of multiple cells to receive multiple GNSS correction information. In some examples, the rover 1070 may attach to multiple cells at the same time to receive the GNSS correction information (e.g., the GNSS correction information may be sent on a control channel that is directed at a specific mobile device or a group of mobile devices), or may attach to one cell (e.g., to perform other functions) and simultaneously and continuously monitor the control channels of other cells, or may not attach to any cell at all and instead simply monitor the broadcast control channels of various nearby cells (if the control channels utilized to send the GNSS correction information are broadcast control channels). The latter particular example would eliminate the need for signaling between the rover device and the cellular network altogether.

In some examples, the base stations 1050 and 1040 may be synchronized and may send out the GNSS correction information at the same or near the same time. In these examples, the rover may be able to save power by only activating its receivers at or near the expected time GNSS correction information is scheduled for transmission. The remaining times the receivers may be in a sleep mode. In other examples, the GNSS correction information transmissions may be coordinated across multiple base stations (e.g., by a higher layer component in the cellular network such as an RNC) so that one base station transmits the GNSS correction information at a first time period and the second base station transmits the GNSS correction information at a second time period which is different from the first. Thus base stations in a particular geographical area may stagger their GNSS correction information transmissions to allow a rover the ability continuously receive correction information from a number of cellular sites with only one cellular module.

Figure 2:
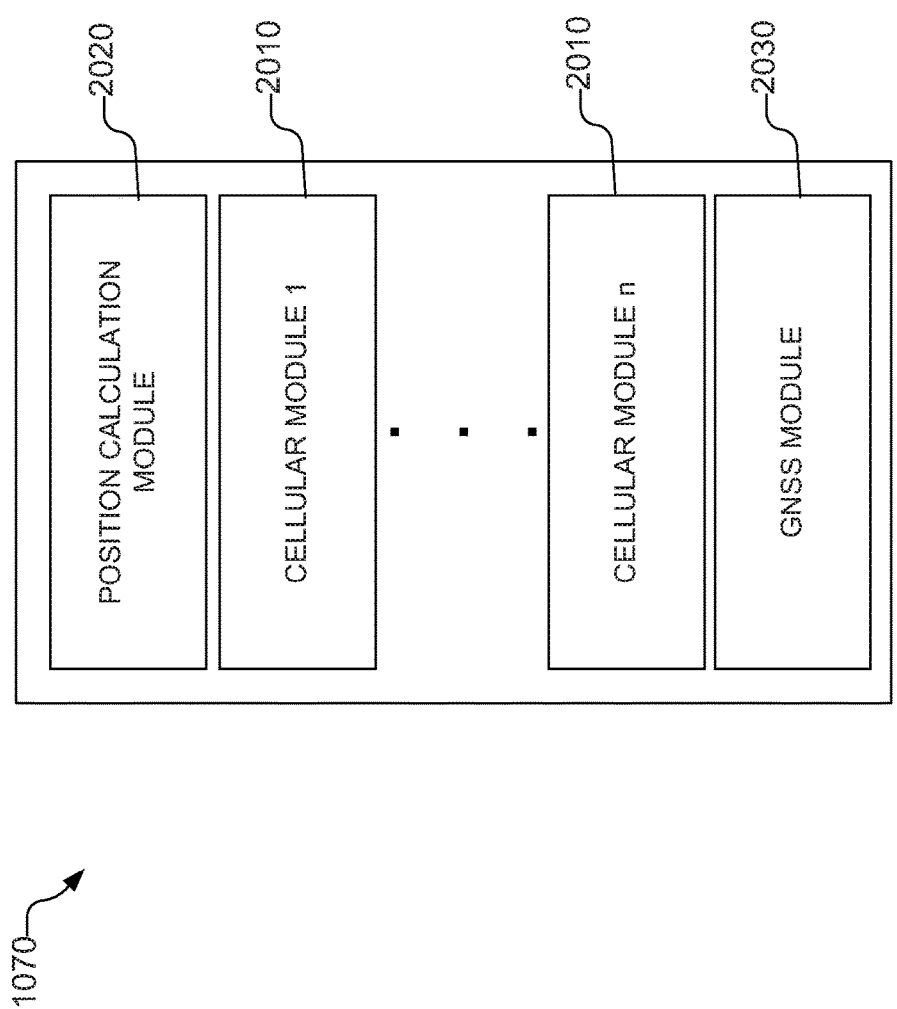
FIG. 2 shows a schematic of a rover according to some examples of the present disclosure.

An example of a rover 1070 is shown in FIG. 2. Unlike traditional cell phones which attach onto one cell and periodically scan nearby cells (to take measurements for handover purposes), rover 1070 may contain any number of cellular modules 2010 which may communicate with several neighboring cells simultaneously and/or continuously. For example, rover 1070 may contain one, two, or more cellular modules 2010. A cellular module 2010 includes any functionality (hardware and software) to enable the Rover 1070 to send and/or receive information across a cellular wireless network including one or more cellular receivers. The multiple cellular modules 2010 may be configured in a number of ways. For example, the Rover 1070 may utilize the multiple cellular modules 2010 to receive GNSS correction information from multiple cells simultaneously by attaching to each cell. In another configuration, the Rover 1070 may utilize the various cellular modules 2010 to attach to a single cell with a first cellular module 2010 (and monitor the control channels for GNSS correction information and simultaneously (and/or continuously) monitor the control channels of other neighboring cells for GNSS correction information with other cellular modules 2010. In yet another configuration, the Rover 1070 may not attach to any cells, instead monitoring the control channels of multiple cells simultaneously and continuously using one or more cellular modules 2010 (this may be possible if the GNSS correction information is transmitted over a broadcast control channel—i.e., the rover does not need to attach to a particular cell to receive a broadcast channel).

The rover 1070 may have a configuration preset, or have settings associated with a user interface for selecting a desired configuration. In other examples, the rover 1070 may automatically select a particular configuration based upon the configuration of the network in which it is monitoring or attached to. For example, a particular carrier may setup their network so that the GNSS correction information is transmitted over a broadcast control channel. In this case, the rover may automatically select the configuration in which it does not attach to any cell. In yet other examples, the carrier may transmit the GNSS correction information over dedicated control channels. In these examples, the rover may automatically select a configuration requiring that the cellular modules 2010 each attach to a different cell. The rover may determine the network configuration of the network by utilizing a predefined list of networks which may include information on when and how GNSS correction information is transmitted in the network (e.g., which cells transmit GNSS correction information at which times). This information may be pre-programmed and stored on the rover, or may be downloaded periodically by the rover from a server. In other examples, the network characteristics as it relates to GNSS correction information may be determined based upon system information broadcast on a control channel. In still other examples, the network's configuration may be determined by the rover automatically by monitoring the network's cells for a GNSS correction signal. The rover may monitor the cell and various neighboring cells to determine if the GNSS correction information is transmitted on a broadcast control channel or if it is transmitted for particular rovers.

It is also contemplated that a network may be setup such that some cells may broadcast the GNSS correction information while other cells of the network direct the GNSS correction information on control channels specific to a group of one or more rovers. In these configurations, some of the cellular modules 2010 may attach to the cells which direct the GNSS correction information to a particular rover, while the remaining cellular modules 2010 may monitor the control channels of cells which broadcast the GNSS correction information without attaching to the cell.

While the various cellular modules 2010 may be for the same type of network, for even better coverage, the various cellular modules 2010 may even work with different types of networks. For example, a first cellular module 2010 may be a GSM receiver, whereas a second cellular module 2010 may be a CDMA2000 receiver.

The rover configuration described herein may be compared to traditional mobiles which attach to one cell and periodically scan neighboring cells. Traditional mobiles may be unsuitable for GNSS correction information as the rover 1070 may miss the GNSS correction information being transmitted while it is scanning another cell. Thus simultaneous monitoring of multiple cells allows the rover 1070 to avoid missing any GNSS correction information. However, in examples in which the cellular network staggers the transmission of the GNSS correction information, the rover 1070 may have a single cellular module 2010 which schedules its scan of the neighboring devices based upon an expected transmission time of GNSS correction information on those cells. In these examples, the rover may tune to a first cell and receive GNSS correction information, switch to another cell and receive GNSS correction information and the like. To accomplish this, the rover must know the proper timing of the GNSS correction information from each cell. The rover may determine this in many ways. For example, the timing of the GNSS messages of nearby cells may be broadcast by each cell, the timing may be fixed and known in advance or downloaded by the rover, the timing may be determined based upon a cell id number (e.g., the cell id number may be input into an algorithm that determines a time in which the GNSS message is transmitted), or the timing may be learned based upon past observations of the timing of GNSS messages.

The cellular network may impose certain restrictions on allowing rovers to attach to multiple cells simultaneously. For example, certain cellular networks may prevent the same mobile identifier (e.g., an International Mobile Subscriber Identity or IMSI) from attaching to multiple cells. In order to work around this, multiple IMSIs may be provided to the rover through the provisioning of multiple Subscriber Identity Modules (SIM) or other access cards to the rover. In other examples modifications to the core network of the cellular network may be utilized to allow for one mobile device to be registered with multiple cells. In these examples, certain mobile identification numbers (e.g., IMSIs) may be designated as rover units which may indicate to the core network to allow the rover to attach on multiple cells using the same identification. Thus, certain identification numbers may convey certain additional privileges with respect to the cellular networks.

Aside from increased geospatial accuracy, another benefit to using multiple cellular modules 2010 is that since the rover 1070 is attached to multiple cells, or at least monitoring the GNSS correction information on multiple cells simultaneously and continuously, there may be minimal or no interruption in GNSS correction information availability during a handover.

Returning to FIG. 2, the cellular modules (1-*n*) 2010 of the rover 1070 feed GNSS correction information received from these cells to a position calculation module 2020. Position calculation module 2020 uses these correction values along with the signal received by the GNSS module 2030 to calculate the geospatial position of the rover 1070.

The position calculation module may utilize a number of different algorithms with respect to the GNSS correction information. In one example, the position calculation module may utilize only the GNSS correction information received from one cell. The cell whose GNSS correction information is used may be selected based upon various selection algorithms. One selection algorithm utilizes the GNSS correction information provided by the base station which is closest to the rover. This data may be preferred as it will likely represent the most accurate GNSS correction information because it will most closely account for the atmospheric and other conditions experienced by the rover which might cause error in the GNSS signal. The location of the cell base station may be explicitly determined by base station coordinate information sent along with the GNSS correction information (which may be compared with a coarse calculation of the rover's position determined from the GNSS signal alone), or may be determined implicitly based upon the quality of the received signal containing the GNSS correction information.

In still other examples, the GNSS correction information transmitted by multiple cellular base stations may be utilized in the geospatial position calculation. In some examples, all the received GNSS correction information may be utilized. In other examples, some GNSS correction information may be utilized and yet other GNSS correction information may not be utilized. In cases in which not all the GNSS correction information is utilized, the selection of which GNSS information for inclusion in the position calculations may be determined based on a number of factors including: calculated or perceived distance between the rover and the base station providing the GNSS correction information, a perceived validity of the GNSS correction information (e.g., the rover may determine that the correction data is not valid, or not likely valid), or the like.

Once the proper GNSS correction information to use is determined, the correction value may be calculated. In some examples, the GNSS correction information from multiple base stations may be averaged together to form a composite correction value which is then used to calculate a geospatial position. In still other examples, a rough positioning of the rover may be utilized along with the locations (or a location estimated through a received signal strength and/or quality) of the base stations from which the GNSS correction information which are to be used were received to interpolate a likely correction value for the rover. This likely correction value may then be used to calculate a geospatial position. In additional examples the various GNSS correction information may be weighted, where the weights may be determined based upon an explicit or implicit determination of the proximity of the base station which sent the data (e.g., GNSS correction information from closer base stations may be more heavily weighted than GNSS correction information from further base stations). These weighted correction values may then be used to calculate a geospatial position.

Figure 3:
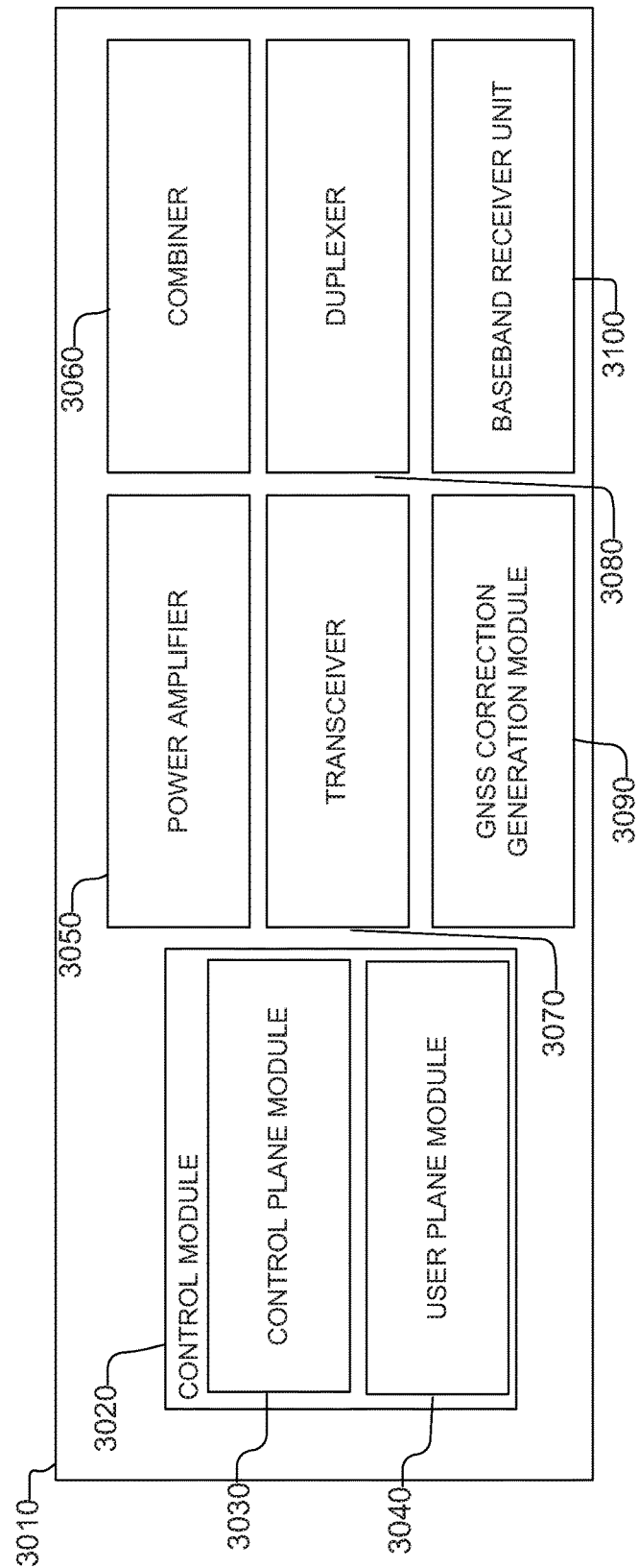
FIG. 3 shows a schematic of a cellular base station with an integrated GNSS correction generation device according to some examples of the present disclosure.

As already noted, the GNSS correction generation device may be integrated with the cellular base station, or may be external to it, at or near the base station site. FIG. 3 shows an example integrated GNSS correction generator and cellular base station 3010. Base station 3010 may include a control module 3020 which may handle both user plane portions of the base station (i.e. user data and traffic) through the user plane module 3040 and control plane portions of the base station (i.e., control messages and signaling including control channels) through control plane module 3030. The control module 3020 is responsible for determining the data sent over transceiver 3070 and for processing signals sent by other devices to the base station received by the transceiver 3070. Transceiver 3070 handles the transmission and reception of the cellular communications signals over the air interface as well as the transmission and reception of signals between the base station 3010 and higher level entities (e.g., an RNC). In some examples, the base station 3010 may contain multiple transceivers. Power amplifier 3050 may amplify the signal generated by the transceiver 3070 for transmission. Combiner 3060 may combine signals from multiple transceivers 3070 for transmission on a single antenna. Duplexer 3080 separates signals sent from the base station and received from mobile stations so that a single antenna may be used for both transmission and reception. The baseband receiver unit 3100 may control frequency hopping, digital signal processing, and the like.

GNSS correction generation module 3090 receives a GNSS signal and calculates a correction value to supply to the control module 3020 (in some examples, the control plane module 3030) for broadcast over the control channels of the cellular network.

While FIG. 3 included the GNSS correction generation module 3090 as integrated with the base station 3010, the GNSS correction generation module 3090 may be external to the base station 3010 and may supply the GNSS correction information through a data interface to the control module 3020.

Figure 4:
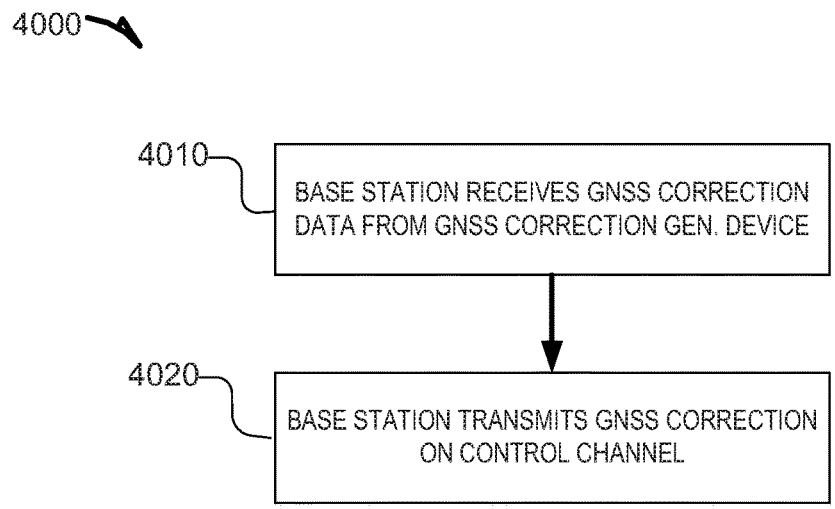
FIG. 4 shows a flowchart of a method of transmitting GNSS correction information over a control channel of a wireless network according to some examples of the present disclosure.

Turning now to FIG. 4, a method 4000 of supplying GNSS correction information over cellular control channels using an external GNSS correction unit is shown. At operation 4010 the base station receives GNSS correction information from an GNSS correction generating unit through an external interface. In some examples, the GNSS correction information may be sent with a predetermined periodicity which is timed to coincide with the appropriate time at which the GNSS correction information is to be sent over the control channel of the cell. In this example, the cellular base station need only to receive the data, and then transmit the data. In other examples, the cellular base station may buffer the GNSS correction information until the appropriate transmission time. At the appropriate transmission time, the cellular base station may transmit the GNSS correction information on the appropriately chosen control channel at operation 4020. The appropriate time may be selected based upon the underlying wireless network type and the particular availability of space to transmit additional information on the selected control channel(s). If the appropriate control channel is a control channel transmitted to particular rover units, the base station may determine if any rover is currently attached and listening to the control channels of the cell (e.g., through a maintained list), and page these mobiles or otherwise make the mobiles aware of the dedicated control channel which will contain the GNSS correction information.

Figure 5:
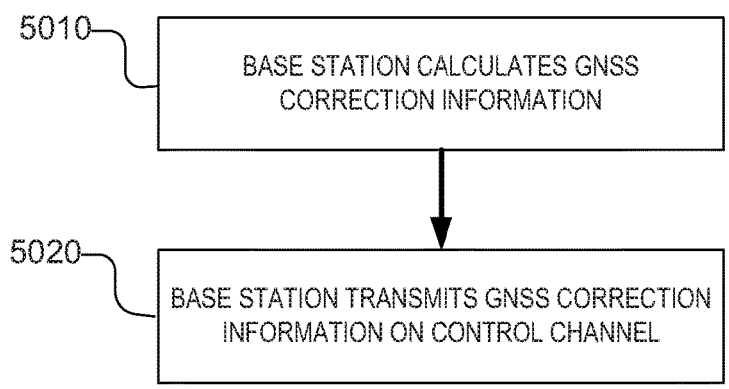
FIG. 5 shows a flowchart of a method of transmitting GNSS correction information over a control channel of a wireless network according to some examples of the present disclosure.

Turning now to FIG. 5, a method 5000 of supplying GNSS correction information over cellular control channels using an integrated GNSS correction unit is shown. At operation 5010, the cellular base station calculates the appropriate GNSS correction information internally. At operation 5020 the cellular base station transmits the GNSS correction information at the appropriate time on the appropriate channel.

Figure 6:
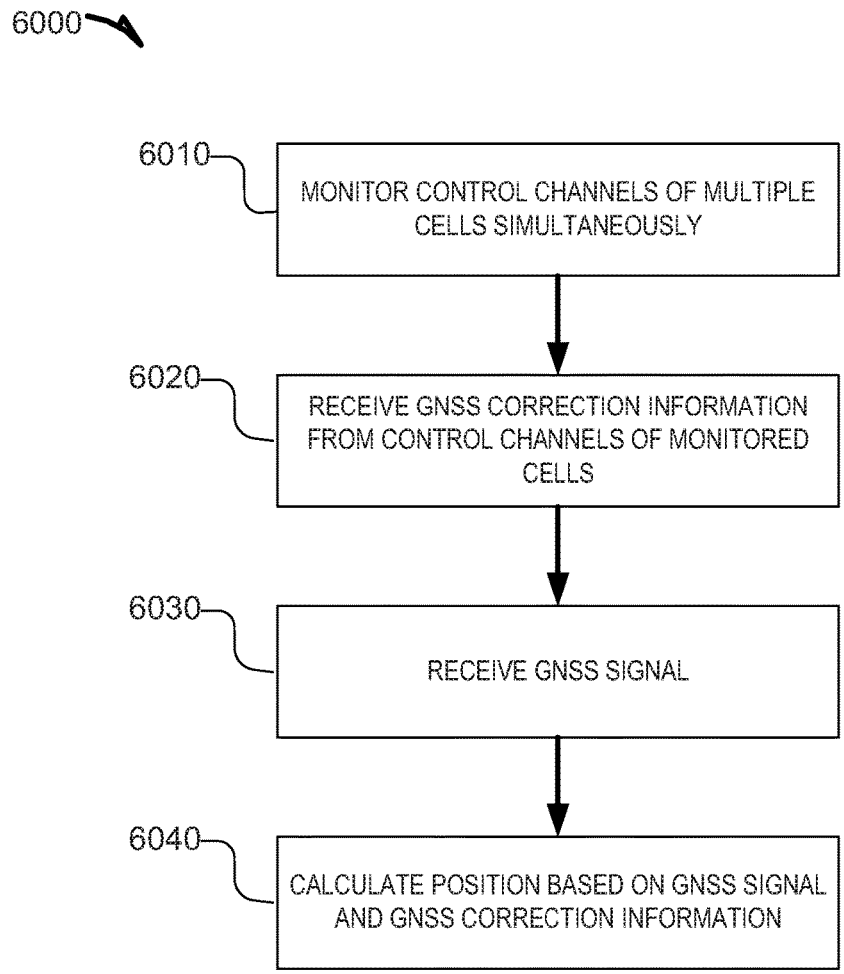
FIG. 6 shows a flowchart of a method of calculating a more accurate geospatial position by using GNSS correction information transmitted over one or more control channels of a wireless network according to some examples of the present disclosure.

Turning now to FIG. 6, a method 6000 of calculating a geospatial position based upon GNSS correction information supplied over a cellular control channel is shown. At operation 6010 a rover device may monitor one or more control channels of one or more cells simultaneously. At operation 6020, the rover may receive GNSS correction information from one or more of the control channels of the monitored cells. At operation 6030, the rover may receive a GNSS signal. At operation 6040 the rover may calculate its position based upon the GNSS signal and the GNSS correction information received from the cellular base station. The particular way in which the GNSS correction information is utilized in the geospatial positioning determination was previously described.

The specification describes a geospatial position. In some examples, a geospatial position may be comprised of a three dimensional position of an object relative to the surface of the earth. For example, the position may be a latitude, longitude, and altitude of an object relative to the earth's surface.

In some other examples, the rover 1070 may receive other positioning related signals and utilize those signals in its position calculations. For example, networks of ground-based GNSS like transmitters which are time synchronized and which operate on the Industrial, Scientific, and Medical unlicensed frequency spectrum have been utilized which broadcast signals very similar to GNSS signals. These GNSS replacement signals enable devices to position themselves using these signals, GNSS signals, or a combination. Examples of these systems include those developed by LOCATA Corporation of Australia. In these examples, the rover 1070 may utilize one or more GNSS replacement signals in addition to, or as a substitution for, a GNSS signal in the position calculation.

Additionally, in lieu of or in addition to transmission of GNSS correction information over the control plane, the base stations may transmit GNSS substitute signals (e.g., LOCATA® type signals) for use by rovers 1070. Rovers 1070 may then use these signals to calculate their position. This may allow for a wide distribution of GNSS-substitute transmission stations using existing wireless infrastructure and allow for a lower cost alternative than the deployment of special stations which broadcast the GNSS-substitute transmissions.

Additionally, in some examples, the rover may employ additional geospatial location determination methods. For example the rover may include inertial navigation functionality which may enable the rover to navigate using dead-reckoning methods. The rover may include one or more motion sensors (e.g., accelerometers), rotation sensors (gyroscopes) or other sensors to measure movement of the rover such that the rover may calculate its position based upon a detected change since its last known position (e.g., as calculated using geospatial methods (e.g., RTK)). Another example geospatial location determination method that may be employed by the rover may include to the ability to calculate its position by estimating the distance between several base stations using various characteristics of the received cellular signal (e.g., received signal strength, signal quality, or the like). Based on these distances the rover may be able to triangulate its position. These alternative methods may be used to supplement the position calculated by any of the methods disclosed herein. Thus, for example, if the rover is unable to communicate with the geospatial satellite, the rover may use GNSS replacement signals, inertial navigation, positioning based on received cellular signals, or any combination. In some examples, the positions calculated by these other methods may be used when calculating the GNSS corrections. For example, the inertial or cellular based positioning methods may be used to determine if there is an error in the position calculated using the GNSS system, or may be used to select the appropriate GNSS correction data to use (e.g., determining the distances to the base stations), or in weighting the various sets of GNSS correction data, or the like.

Certain embodiments are described herein as including logic or a number of components, modules, or mechanisms. Modules or components may constitute either software modules code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA), an application-specific integrated circuit (ASIC) or microprocessor) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).) Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC). The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
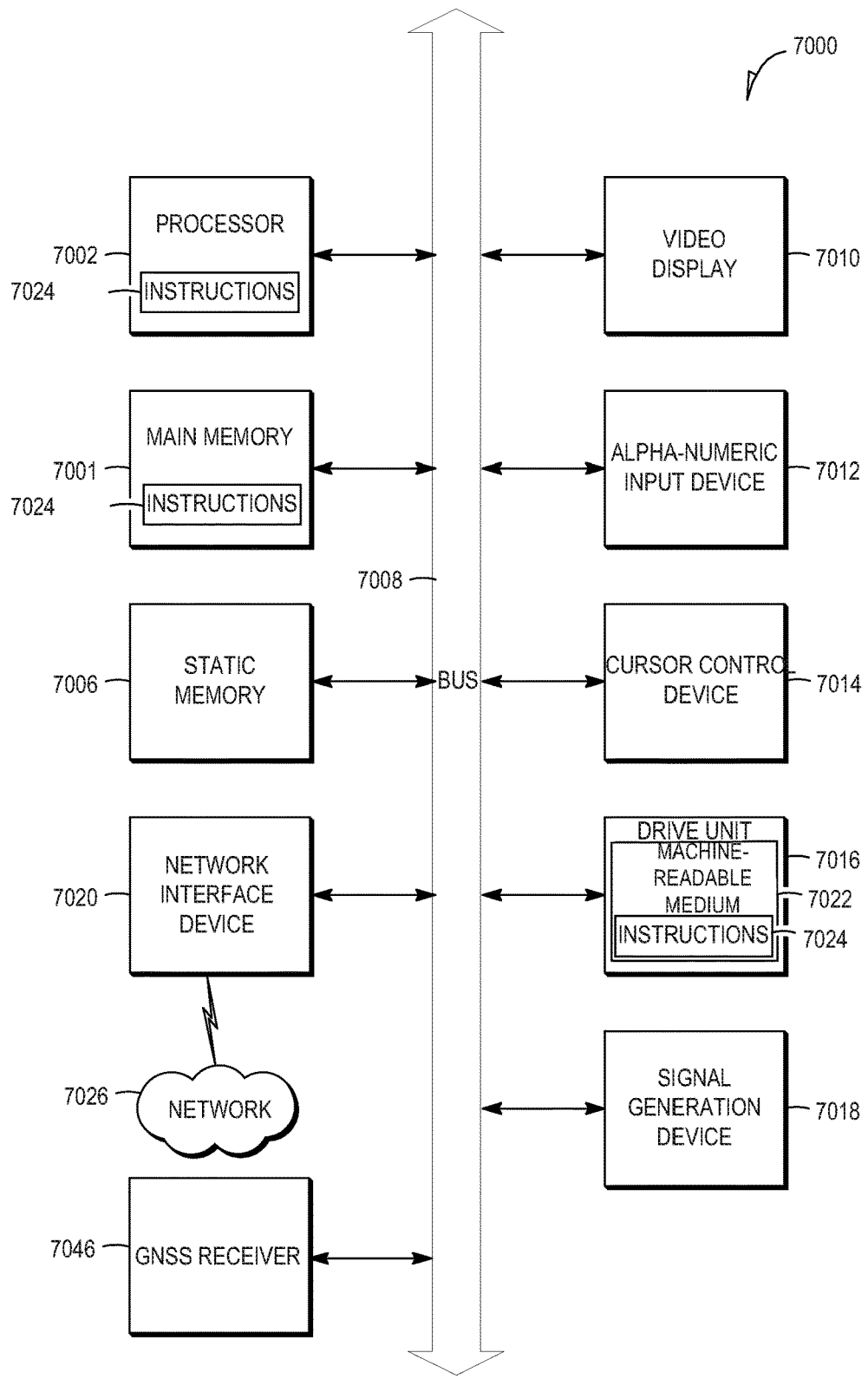
FIG. 7 shows a schematic of a machine according to some examples of the present disclosure.

FIG. 7 shows a diagrammatic representation of a machine in the example form of a computer system 7000 within which a set of instructions for causing the machine to perform any one or more of the methods, processes, operations, or methodologies discussed herein may be executed. In some examples, the mobile device (e.g., the rover) and/or the network components (e.g., base station, core network, etc . . . ) may be or contain portions of the computer system 7000. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 7000 includes a processor 7002 a Central Processing Unit (CPU), a Graphics Processing Unit (GPU) or both), a main memory 7001 and a static memory 7006, which communicate with each other via a bus 7008. The computer system 7000 may further include a video display unit 7010 (e.g., a Liquid Crystal Display (LCD) or a Cathode Ray Tube (CRT)). The computer system 7000 also includes an alphanumeric input device 7012 (e.g., a keyboard), a User Interface (UI) cursor controller 7014 (e.g., a mouse), a disk drive unit 7016, a signal generation device 7018 (e.g., a speaker) and a network interface device 7020 (e.g., a transmitter).

The disk drive unit 7016 includes a machine-readable medium 7022 on which is stored one or more sets of instructions 7024 and data structures (e.g., software) embodying or used by any one or more of the methodologies or functions illustrated herein. The software may also reside, completely or at least partially, within the main memory 7001 and/or within the processor 7002 during execution thereof by the computer system 7000, the main memory 7001 and the processor 7002 also constituting machine-readable media.

The instructions 7024 may further be transmitted or received over a network 7026 via the network interface device 7020 using any one of a number of well-known transfer protocols (e.g., HTTP, Session Initiation Protocol (SIP)). The network interface device 7020 may be any device used to access a network 7026 including an Ethernet card, a wireless card for accessing a wireless network (e.g., an 802.11 card, a cellular card for accessing a cellular network such as a Long Term Evolution network or a UMTS network, or the like), a token ring card, or the like. Machine 7000 may also include a GNSS receiver 7046 for receiving GNSS signals from a GNSS satellite.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

These examples can be combined in any permutation or combination. This overview is intended to provide an overview of subject matter of the present patent application. It is not intended to provide an exclusive or exhaustive explanation of the invention. The detailed description is included to provide further information about the present patent application.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

OTHER EXAMPLES

Example 1

A method of receiving geospatial positioning information, the method comprising: monitoring with a mobile device a first control channel from a first cell of a cellular communications system; monitoring with the mobile device a second control channel from a second cell of the cellular communications system at the same time as the first cellular control channel; receiving with the mobile device a first correction value sent over the first control channel; receiving with the mobile device a second correction value sent over the second control channel; receiving with the mobile device a signal from a global navigation satellite system; calculating with the mobile device the geospatial position based upon the signal from the global navigation satellite system and at least one of the first correction value and the second correction value.

Example 2

The method of example 1, wherein the first and second control channels are broadcast control channels.

Example 3

The method of any one of examples 1-2, wherein cellular communications system is a cellular communications system operating in accordance with one of: a Universal Mobile Telecommunications System (UMTS) standard, a Global System for Mobile Communications (GSM) standard, a Long Term Evolution (LTE) standard, a Evolution-Data Optimized (EV-DO) standard, and a Code Division Multiple Access 2000 (CDMA2000) standard;

Example 4

The method of any one of examples 1-3, wherein the first correction value is transmitted by a first base station and the second correction value is transmitted by a second base station and the method comprises selecting the first correction value to use in calculating the geospatial position based upon a determination that the first base station is closer in proximity to the mobile device than the second base station.

Example 5

The method of example 4, wherein the determination that the first base station is closer in proximity is based upon a comparison of a received signal quality of a signal transmitted by the first base station and a received signal quality of a signal transmitted by the second base station.

Example 6

The method of example 4, wherein the determination that the first base station is closer in proximity to the mobile device is based upon a determination that a distance between the mobile device and the first base station is less than a distance between the mobile device and the second base station, the distances being calculated based upon a geospatial position of the first and second base stations and a calculation of a geospatial position of the rover based upon only the signal from the global navigation satellite system.

Example 7

The method of any one of examples 1-3, wherein the geospatial position is calculated based upon both the first and second correction values.

Example 8

The method of example 7, wherein the geospatial position is calculated by weighting the first correction value by a first weighting value and the second correction value by a second weighting value.

Example 9

The method of any one of examples 1-8, wherein the correction value is a real time kinematic correction value.

Example 10

The method of any one of examples 1-9, wherein receiving the first and second correction values includes receiving the values without establishing a dedicated data connection with the first or second cell.

Example 11

A mobile device for receiving a geospatial position, the mobile device comprising: a first cellular module configured to monitor a first control channel from a first cell of a cellular communications system and to receive a first correction value over the first control channel; a second cellular module configured to monitor a second control channel from a second cell of the cellular communications system at the same time as the first cellular control channel and to receive a second correction value sent over the second control channel; a global navigation satellite system module configured to receive a signal from a global navigation satellite system; and a position calculation module configured to calculate the geospatial position based upon the signal from the global navigation satellite system and at least one of the first correction value and the second correction value.

Example 12

The mobile device of example 11, wherein the first and second control channels are broadcast control channels.

Example 13

The mobile device of any one of examples 11-12, wherein the cellular communications system is a cellular communications system operating in accordance with one of: a Universal Mobile Telecommunications System (UMTS) standard, a Global System for Mobile Communications (GSM) standard, a Long Term Evolution (LTE) standard, a Evolution-Data Optimized (EV-DO) standard, and a Code Division Multiple Access 2000 (CDMA2000) standard;

Example 14

The mobile device of any one of examples 11-13, wherein the first correction value is transmitted by a first base station and the second correction value is transmitted by a second base station and the position calculation module is configured to select the first correction value to use in calculating the geospatial position based upon a determination that the first base station is closer in proximity to the mobile device than the second base station.

Example 15

The mobile device of example 14, wherein the position calculation module is configured to determine that the first base station is closer in proximity based upon a comparison of a received signal quality of a signal transmitted by the first base station and a received signal quality of a signal transmitted by the second base station.

Example 16

The mobile device of example 14, wherein the position calculation module is configured to determine that the first base station is closer in proximity to the mobile device than the second base station based upon a determination that a distance between the mobile device and the first base station is less than a distance between the mobile device and the second base station, the distances being calculated based upon a geospatial position of the first and second base stations and a calculation of a geospatial position of the rover based upon only the signal from the global navigation satellite system.

Example 17

The mobile device of any one of examples 11-13 wherein position calculation module is configured to calculate the geospatial position based upon both the first and second correction values.

Example 18

The mobile device of example 17, wherein position calculation module is configured to calculate the geospatial position by weighting the first correction value by a first weighting value and the second correction value by a second weighting value.

Example 19

The mobile device of any one of examples 11-18, wherein the correction value is a real time kinematic correction value.

Example 20

The mobile device of any one of examples 11-19, wherein receiving the first and second correction values includes receiving the values without establishing a dedicated data connection with the first or second cell.

Example 21

A machine-readable medium that stores instructions which when performed by a machine, cause the machine to perform operations comprising: monitoring with a mobile device a first control channel from a first cell of a cellular communications system; monitoring with the mobile device a second control channel from a second cell of the cellular communications system at the same time as the first cellular control channel; receiving with the mobile device a first correction value sent over the first control channel; receiving with the mobile device a second correction value sent over the second control channel; receiving with the mobile device a signal from a global navigation satellite system; calculating with the mobile device a geospatial position of the mobile device based upon the signal from the global navigation satellite system and at least one of the first correction value and the second correction value.

Example 22

The machine-readable medium of example 21, wherein the first and second control channels are broadcast control channels.

Example 23

The machine-readable medium of any one of claims 21-22, wherein the cellular communications system is a cellular communications system operating in accordance with one of: a Universal Mobile Telecommunications System (UMTS) standard, a Global System for Mobile Communications (GSM) standard, a Long Term Evolution (LTE) standard, a Evolution-Data Optimized (EV-DO) standard, and a Code Division Multiple Access 2000 (CDMA2000) standard;

Example 24

The machine-readable medium of any one of claims 21-24, wherein the first correction value is transmitted by a first base station and the second correction value is transmitted by a second base station and the instructions include instructions which when performed by the machine, cause the machine to perform the operations comprising: selecting the first correction value to use in calculating the geospatial position based upon a determination that the first base station is closer in proximity to the mobile device than the second base station.

Example 25

The machine-readable medium of example 24, wherein the instructions include instructions which when performed by the machine, cause the machine to perform the operations comprising: determining that the first base station is closer in proximity based upon a comparison of a received signal quality of a signal transmitted by the first base station and a received signal quality of a signal transmitted by the second base station.

Example 26

The machine-readable medium of example 24, wherein the instructions include instructions which when performed by the machine, cause the machine to perform the operations comprising: determining that the first base station is closer in proximity to the mobile device than the second base station based upon a determination that a distance between the mobile device and the first base station is less than a distance between the mobile device and the second base station, the distances being calculated based upon a geospatial position of the first and second base stations and a calculation of a geospatial position of the rover based upon only the signal from the global navigation satellite system.

Example 27

The machine-readable medium of any one of examples 21-23, wherein the instructions include instructions which when performed by the machine, cause the machine to perform the operations comprising: calculating the geospatial position based upon both the first and second correction values.

Example 28

The machine-readable medium of example 27, wherein the instructions include instructions which when performed by the machine, cause the machine to perform the operations comprising: calculating the geospatial position by weighting the first correction value by a first weighting value and the second correction value by a second weighting value.

Example 29

The machine-readable medium of any one of examples 21-28, wherein the correction value is a real time kinematic correction value.

Example 30

The machine-readable medium of any one of examples 21-29, wherein the instructions include instructions which when performed by the machine, cause the machine to perform the operations comprising: receiving the first and second correction values without establishing a dedicated data connection with the first or second cell.

The claimed invention is:

1. A method of receiving geospatial positioning information, the method comprising:
   monitoring with a mobile device a first control channel from a first cell of a cellular communications system;
   determining from a past observation of a message on the first control channel of the first cell of the cellular communications system, a first time that a first correction value will be sent from the first control channel and a second time that a second correction value will be sent from a second control channel from a second cell of the cellular communication system;
   receiving with the mobile device the first correction value sent over the first control channel at the first time;
   receiving with the mobile device the second correction value sent over the second control channel at the second time;
   receiving with the mobile device a signal from a global navigation satellite system; and
   calculating with the mobile device a geospatial position of the mobile device based upon the signal from the global navigation satellite system and at least one of the first correction value and the second correction value.

2. The method of claim 1, wherein the first and second control channels are broadcast control channels.

3. The method of claim 1, wherein the cellular communications system is a cellular communications system operating in accordance with one of: a Universal Mobile Telecommunications System (UMTS) standard, a Global System for Mobile Communications (GSM) standard, a Long Term Evolution (LTE) standard, an Evolution-Data Optimized (EVDO) standard, and a Code Division Multiple Access 2000 (CDMA2000) standard.

4. The method of claim 1, wherein calculating with the mobile device the geospatial position of the mobile device based upon the signal from the global navigation satellite system and at least one of the first correction value and the second correction value comprises:
   determining that a first base station that transmits the first cell is closer in proximity to the mobile device than a second base station that transmits the second cell; and
   calculating, with the mobile device, the geospatial position of the mobile device based upon the signal from the global navigation satellite system and the first correction value and not based upon the second correction value.

5. The method of claim 1, wherein the first and second control channels are dedicated control channels.

6. The method of claim 5, comprising: attaching the mobile device to the first control channel to observe the message on the first control channel.

7. The method of claim 6, comprising:
   determining a third time that a third correction value will be sent from the first control channel and a fourth time that a fourth correction value will be sent from the second control channel from the second cell of the cellular communication system;
   determining that reception of the third correction value is not possible and in response, receiving with the mobile device the fourth correction value sent over the second control channel at the fourth time;
   receiving with the mobile device a second signal from the global navigation satellite system;
   calculating with the mobile device a second geospatial position of the mobile device based upon the second signal from the global navigation satellite system and the fourth correction value; and
   displaying the second geospatial position on a screen of the mobile device.

8. A mobile device for receiving geospatial positioning information, the mobile device comprising:
   a processor configured by a non-transitory machine readable medium to perform operations comprising:
   monitoring with the mobile device a first control channel from a first cell of a cellular communications system;
   determining from a past observation of a message on the first control channel of the first cell of the cellular communications system, a first time that a first correction value will be sent from the first control channel and a second time that a second correction value will be sent from a second control channel from a second cell of the cellular communication system;
   receiving with the mobile device the first correction value sent over the first control channel at the first time;
   receiving with the mobile device the second correction value sent over the second control channel at the second time;
   receiving with the mobile device a signal from a global navigation satellite system; and
   calculating with the mobile device a geospatial position of the mobile device based upon the signal from the global navigation satellite system and at least one of the first correction value and the second correction value.

9. The mobile device of claim 8, wherein the first and second control channels are broadcast control channels.

10. The mobile device of claim 8, wherein the cellular communications system is a cellular communications system operating in accordance with one of: a Universal Mobile Telecommunications System (UMTS) standard, a Global System for Mobile Communications (GSM) standard, a Long Term Evolution (LTE) standard, a Evolution-Data Optimized (EV-DO) standard, and a Code Division Multiple Access 2000 (CDMA2000) standard.

11. The mobile device of claim 8, wherein the operations of calculating the geospatial position of the mobile device based upon the signal from the global navigation satellite system and at least one of the first correction value and the second correction value comprises:
  determining that a first base station that transmits the first cell is closer in proximity to the mobile device than a second base station that transmits the second cell; and
  calculating with the mobile device the geospatial position of the mobile device based upon the signal from the global navigation satellite system and the first correction value and not based upon the second correction value.

12. The mobile device of claim 11, wherein the operations of determining that the first base station is closer in proximity to the mobile device than the second base station comprises determining that the first base station is closer based upon a determination that a received signal quality of a signal transmitted by the first base station is better than a received signal quality of a signal transmitted by the second base station.

13. The mobile device of claim 8, wherein the first and second control channels are dedicated control channels.

14. The mobile device of claim 8, wherein the operations further comprise: attaching the mobile device to the first control channel to observe the message on the first control channel.

15. A non-transitory machine-readable medium that stores instructions which when performed by a machine, cause the machine to perform operations comprising:
  monitoring with a mobile device a first control channel from a first cell of a cellular communications system;
  determining from a past observation of a message on the first control channel of the first cell of the cellular communications system, a first time that a first correction value will be sent from the first control channel and a second time that a second correction value will be sent from a second control channel from a second cell of the cellular communication system;
  receiving with the mobile device the first correction value sent over the first control channel at the first time;
  receiving with the mobile device the second correction value sent over the second control channel at the second time;
  receiving with the mobile device a signal from a global navigation satellite system; and
  calculating with the mobile device a geospatial position of the mobile device based upon the signal from the global navigation satellite system and at least one of the first correction value and the second correction value.

16. The non-transitory machine-readable medium of claim 15, wherein the first and second control channels are broadcast control channels.

17. The non-transitory machine-readable medium of claim 15, wherein the cellular communications system is a cellular communications system operating in accordance with one of: a Universal Mobile Telecommunications System (UMTS) standard, a Global System for Mobile Communications (GSM) standard, a Long Term Evolution (LTE) standard, a Evolution-Data Optimized (EV-DO) standard, and a Code Division Multiple Access 2000 (CDMA2000) standard.

18. The non-transitory machine-readable medium of claim 15, wherein the first and second control channels are dedicated control channels.

19. The non-transitory machine-readable medium of claim 18, wherein the operations further comprise attaching the mobile device to the first control channel to observe the message on the first control channel.

20. The non-transitory machine-readable medium of claim 19, wherein the operations further comprise:
  determining a third time that a third correction value will be sent from the first control channel and a fourth time that a fourth correction value will be sent from the second control channel from the second cell of the cellular communication system;
  determining that reception of the third correction value is not possible and in response, receiving with the mobile device the fourth correction value sent over the second control channel at the fourth time;
  receiving with the mobile device a second signal from the global navigation satellite system;
  calculating with the mobile device a second geospatial position of the mobile device based upon the second signal from the global navigation satellite system and the fourth correction value; and
  displaying the second geospatial position on a screen of the mobile device.

* * * * *

UNITED STATES PATENT AND TRADEMARK OFFICE
CERTIFICATE OF CORRECTION

PATENT NO. : 10,101,464 B2  
APPLICATION NO. : 15/175525  
DATED : October 16, 2018  
INVENTOR(S) : Appleford et al.

Page 1 of 1

It is certified that error appears in the above-identified patent and that said Letters Patent is hereby corrected as shown below:

In the Specification

In Column 3, Line 28, after "stream", insert --(e.g.,--

In Column 3, Line 31, delete "e.g.," and insert --(e.g.,-- therefor

In Column 3, Line 45, delete "station,"" and insert --station."-- therefor

In Column 4, Line 22, delete "itsilocation" and insert --its location-- therefor In Column 4, Line 40, delete "trawls" and insert --travels-- therefor In Column 7, Line 22, after "information", insert --)--

In Column 10, Line 33, delete "generating" and insert --generation-- therefor

In Column 12, Line 8, after "modules", insert --(e.g.,--

In Column 13, Line 65, delete "afield" and insert --a field-- therefor

In Column 14, Line 50, after "7002", insert --(e.g.,--

In Column 14, Line 67, delete "andlor" and insert --and/or-- therefor

In Column 17, Line 32, after "wherein", insert --the--

In Column 19, Line 32, after "11-13", insert --,--

Signed and Sealed this  
Twenty-first Day of April, 2020

Andrei Iancu  
*Director of the United States Patent and Trademark Office*